Jan. 16, 1951     D. HAWKS, JR., ET AL     2,538,311
MULTIPLE CHECK COMPARATOR GAUGE
Filed Nov. 24, 1948
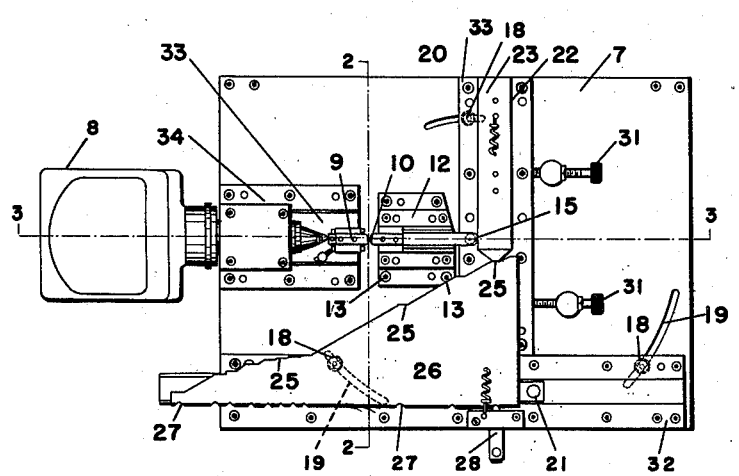
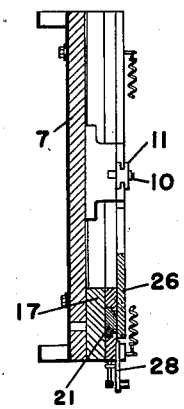
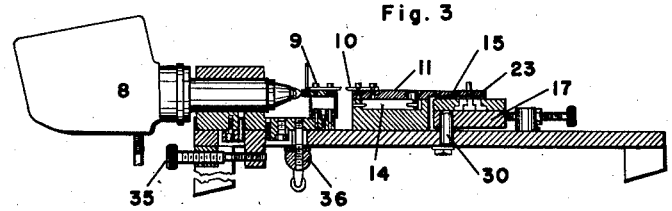
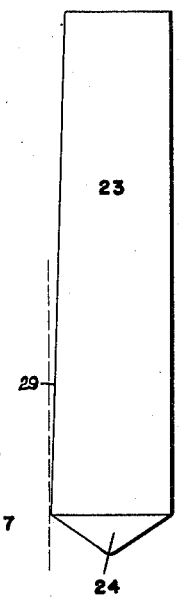
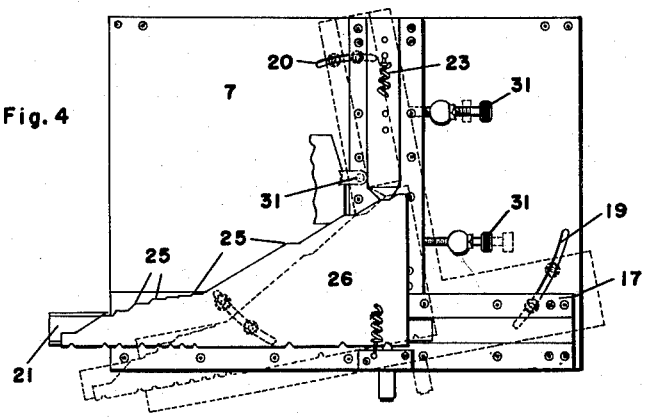
INVENTORS.
DOUGLASS HAWKS JR.
EGBERT VAN HAAFTEN
BY
ATTY.

Patented Jan. 16, 1951

2,538,311

UNITED STATES PATENT OFFICE 2,538,311

MULTIPLE CHECK COMPARATOR GAUGE

Douglass Hawks, Jr., Lancaster, and Egbert Van Haaften, Lancaster Township, Lancaster County, Pa., assignors to Hamilton Watch Company, Lancaster, Pa.

Application November 24, 1948, Serial No. 61,762

1 Claim. (Cl. 33—147)

This invention relates to a multiple check gage of the mechanical comparator type.

The conventional method of using a mechanical comparator is to adjust it to show a zero reading when a master, equal in size to the nominal dimension of the work to be inspected, is inserted in the instrument. When the work is inserted, the plus and minus readings of the comparator with respect to its zero point represent the variations of the work with respect to its nominal dimension. Where a single piece of work has as many as nine different dimensions to be accurately inspected, as in the case of the balance staff of a watch, the ordinary comparator must either be reset for each different dimension or nine comparators must be provided, each set for one of the dimensions. In the former instance, an almost prohibitive amount of operator's time is consumed by the resetting. The latter method is expensive because the nine comparators must be purchased and maintained. Furthermore, nine comparators are inconvenient because they occupy considerable space.

The present invention seeks to overcome the necessity of resetting the gage frequently with masters, or shifting the work from one gage to another by providing a gage in which the relatively stationary gaging member may be rapidly and easily reset to accommodate a number of different nominal dimensions.

The object of the present invention is to provide a multiple check gage which may be quickly and easily set to a series of different zero readings for measuring several different dimensions, such as the diameters of a balance staff.

A further object of the present invention is to provide a multiple check gage which will require only one indicating or measuring head.

A still further object of the present invention is to provide a relatively stationary gaging member capable of being quickly, easily and accurately adjusted to a series of zero positions through the use of a pair of sliding cams so arranged that the combined great movement of the two cams produces a very minute fraction of this movement in the relatively stationary gaging member.

A still further object of the present invention is to provide means by which a very accurate final adjustment can be made on the relative movements of the cams and the stationary gaging member.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is shown in the accompanying drawing in which:

Figure 1 is a top plan view of the gage.

Figure 2 is a cross section on line 2—2 of Figure 1.

Figure 3 is a cross section on line 3—3 of Figure 1.

Figure 4 is a top plan view of the cams, the gaging mechanism being omitted and showing the adjustment of the two cams relative to the stationary anvil and to each other.

Figure 5 is an enlarged detail view of one of the cams showing the magnifying angle slightly exaggerated.

Referring to the drawing and particularly Figure 1, a base 7 has mounted thereon an ordinary indicating gage or comparator measuring head 8, having contact with the movable gaging member 9. A relatively stationary gaging member 10 is positioned immediately opposite the movable gaging member 9. The comparator measuring head 8 forms no part of the present invention, being purchased on the open market and fitted into the mechanism.

The comparator measuring head 8 and the movable gaging member 9 are both mounted on sliding member 33. Sliding member 33 is fitted to the slide 34 which in turn is mounted on the base 7. The position of slide 33 may be adjusted longitudinally to the base 7 by means of the compound screw 35. The screw and lever type locking unit 36 will lock slide 33 in position when longitudinal adjustment by means of compound screw 35 has been completed.

The stationary gaging member 10 is secured to a sliding member 11 operating on a slide 12 which is bolted to the base 7 at 13. A compression spring 14 forces the sliding member and its accompanying gaging member 10 constantly to the right or toward the laterally moving cam 23. The end 15 of the sliding member is rounded and contacts the laterally moving cam 23.

A T-shaped slide base 17 is secured to the base member 7 by three bolts 18 which are slidable respectively in three arcuate slots 19. These slots 19, while not at the same radial distance from the center, are concentric with the pin 30, which passes through the base 7 and the T-shaped slide base 17. The pin 30 serves as a pivot for the slide 17 when its angular position is adjusted.

The T-shaped slide base 17 has a longitudinal slide 32 and a lateral slide 33. These slides support and guide the longitudinal sliding member 21 and the lateral sliding member 22. Mounted rigidly on the lateral sliding member is a cam member 23, one side of which engages the rounded end 15 of the sliding member 11. One end 24, of the cam 23, is rounded and adapted to rest on any one of a series of steps 25 of the cam member 26 which is rigidly attached to the sliding member 21.

The cam member 26 is provided with a series of accurately made steps 25 which raise and lower the lateral cam member 23. Due to the taper on cam member 23, a movement of the member 23 will cause a very much smaller movement of the sliding member 11, which serves as a follower for the cam 23. The bottom edge of the cam 26 is formed with a series of notches 27 which engage a pin 28 to serve in positioning the cam member 26 for engagement with the cam member 23 at the desired point.

The cam member 23 is made as accurately as possible with an angle as indicated at 29. This angle, which is sufficient to cause a taper ratio of approximately 100 to 1, causes the sliding member 11 to move back and forth by reason of the lateral movement of the cam 23. Thus it is possible to get a very accurate adjustment of the sliding member 11 and consequently the relatively stationary gaging member 10 through relatively inaccurate movement of the cams 23 and 26. Because it is impractical to grind the angle 29 to the degree of accuracy desired, a further means of accurate adjustment is provided through the pivot 30, about which the entire T-slide 17 may be rotated. This rotation is accomplished through adjustment of the screws 31 to make an accurate setting of the effective taper of the cam 23 in its movement following the cam 26.

What is claimed is:

A multiple comparator gage comprising a base, an indicator mechanism having a movable gaging member mounted on said base, a second gaging member serving as a relatively stationary anvil for said movable gaging member, yet slidably mounted on said base, relative to said base, a pair of slides mounted on said base and at right angles to each other, a cam, tapered on one side slidable in one of said slides and engaging with said tapered side one end of said slidably mounted gaging anvil, a cam formed with a series of steps in said second slide and receiving said tapered sliding cam selectively on any of said steps, and means for rotating said pair of slides together with the cams to vary the effective tapered relation between said sliding tapered cam and said longitudinally movable gaging anvil.

DOUGLASS HAWKS, JR.
EGBERT VAN HAAFTEN.

REFERENCES CITED

The following references are of record in the file of this patent:

UNITED STATES PATENTS

| Number | Name | Date |
|---|---|---|
| 1,318,934 | Thompson | Oct. 14, 1919 |
| 1,335,004 | Lehigh | Mar. 30, 1920 |
| 1,452,834 | Fuchs | Apr. 24, 1923 |
| 1,526,305 | Neumaier | Feb. 10, 1925 |
| 1,637,921 | Simpson et al. | Aug. 2, 1927 |
| 1,725,898 | Chaperlo et al. | Aug. 27, 1929 |
| 2,210,561 | Allen et al. | Aug. 6, 1940 |

FOREIGN PATENTS

| Number | Country | Date |
|---|---|---|
| 580,962 | Great Britain | Sept. 26, 1946 |